United States Patent
Wu et al.

(10) Patent No.: US 12,549,327 B1
(45) Date of Patent: Feb. 10, 2026

(54) CDR LOCK DETECTION BASED ON FREQUENCY DIFFERENTIALS

(71) Applicant: Marvell Asia Pte Ltd, Singapore (SG)

(72) Inventors: Min Wu, San Jose, CA (US); Davide Visani, San Jose, CA (US); Mehedi Hasan, San Jose, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 0 days.

(21) Appl. No.: 18/785,020

(22) Filed: Jul. 26, 2024

Related U.S. Application Data

(60) Provisional application No. 63/535,488, filed on Aug. 30, 2023.

(51) Int. Cl.
  *H04L 7/033* (2006.01)
  *H04L 7/00* (2006.01)
(52) U.S. Cl.
  CPC .......... *H04L 7/0331* (2013.01); *H04L 7/0012* (2013.01)
(58) Field of Classification Search
  CPC .................. H04L 7/0331; H04L 7/0012
  See application file for complete search history.

(56) References Cited

U.S. PATENT DOCUMENTS

| | | | | |
|---|---|---|---|---|
| 5,260,670 A | * | 11/1993 | Ainsworth | ........... G01R 13/345 341/122 |
| 2002/0067778 A1 | * | 6/2002 | Ahn | ..................... H04L 27/2273 375/326 |
| 2009/0052602 A1 | * | 2/2009 | Annampedu | ........... H03L 7/093 375/376 |
| 2011/0026650 A1 | * | 2/2011 | Molina | ................. H03L 7/0807 375/371 |
| 2017/0093558 A1 | * | 3/2017 | Ramezani | ............. H04L 7/0029 |
| 2022/0006676 A1 | * | 1/2022 | Huang | ..................... H03D 3/04 |

* cited by examiner

*Primary Examiner* — Freshteh N Aghdam

(57) ABSTRACT

A transceiver for a network device includes clock data recovery (CDR) circuitry having a digitally controlled oscillator (DCO) and a CDR lock detector, the CDR lock detector including a frequency differential calculator coupled to a first portion of an input to the DCO and configured to determine frequency differentials between a plurality of respective pairs of present first portions of the input to the DCO and corresponding previous first portions of the input to the DCO, and to determine an average of the frequency differentials for the plurality of respective pairs, and circuitry configured to generate, based on the average, an indication of whether the CDR circuitry is locked.

20 Claims, 9 Drawing Sheets

CDR LOCK DETECTION BASED ON FREQUENCY DIFFERENTIALS

CROSS REFERENCE TO RELATED APPLICATION

This disclosure claims the benefit of commonly-assigned U.S. Provisional Patent Application No. 63/535,488, filed Aug. 30, 2023 which is hereby incorporated by reference herein in its entirety.

FIELD OF USE

This disclosure relates to clock-data recovery (CDR) circuitry in a serial interface. More particularly, this disclosure relates to lock detection of the CDR circuitry based on frequency differentials that can be derived from inputs to an oscillator of the CDR circuitry.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

CDR circuitry may be successfully (e.g., the CDR circuitry may be locked) or unsuccessfully (e.g., the CDR circuitry may be unlocked) recovering clock and data information associated with an incoming signal. CDR lock detector circuitry may provide an indication of whether the CDR circuitry is locked or unlocked.

SUMMARY

In accordance with implementations of the subject matter of this disclosure, a transceiver for a network device includes clock data recovery (CDR) circuitry having a digitally controlled oscillator (DCO) and a CDR lock detector, the CDR lock detector including a frequency differential calculator coupled to a first portion of an input to the DCO and configured to determine frequency differentials between a plurality of respective pairs of present first portions of the input to the DCO and corresponding previous first portions of the input to the DCO and to determine an average of the frequency differentials for the plurality of respective pairs, and circuitry configured to generate, based on the average, an indication of whether the CDR circuitry is locked.

In a first implementation of such a CDR lock detector, the frequency differentials may be based on a serial signal received by the transceiver, when the CDR circuitry is locked, the transceiver may recover data of the serial signal, and when the CDR circuitry is unlocked, the transceiver may adjust a timing associated with the DCO.

In a second implementation of such a CDR lock detector, an output of the DCO may be adjusted based on the input to the DCO, the input to the DCO may include a difference between a second portion and the first portion, and the first portion and the second portion may be filtered outputs of time error detector circuitry.

In a third implementation of such a CDR lock detector, the frequency differential calculator may be further configured to decimate the first portion of the input to the DCO, and the frequency differentials may be based on the decimated input.

In a fourth implementation of such a CDR lock detector, each difference of the plurality of differentials may be an absolute value.

In a fifth implementation of such a CDR lock detector, each difference of the frequency differentials may be a difference between successive decimated first portions of the input to the DCO, each first input of the successive decimated inputs may include a previous first portion, and each second input of the successive decimated inputs may include a present first portion.

A sixth implementation of such a CDR lock detector may be configured to generate an indication, may include a first counter, and may indicate that the CDR circuitry is locked based on a value of the first counter.

According to a first aspect of that sixth implementation of such a CDR lock detector, the first counter may be configured to increment when the average is below a first threshold, and the circuitry configured to generate an indication of whether the CDR circuitry may indicate that the CDR circuitry is locked when the value of the first counter exceeds a lock threshold.

In a first instance of that first aspect of that sixth implementation of such a CDR lock detector, the circuitry that is configured to generate an indication of whether the CDR circuitry is locked may further include a second counter that may be configured to increment when the average is above a second threshold, and the circuitry may indicate that the CDR circuitry is unlocked when a value of the second counter exceeds an unlock threshold.

According to a second aspect of that sixth implementation of such a CDR lock detector, the circuitry configured to generate an indication may be further configured to reset the first counter to zero in response to providing the indication of whether the CDR circuitry is locked.

In a seventh implementation of such a CDR lock detector, the present first portions of the input are acquired at a first same point in time from at least a first register of the DCO and a second register of the DCO, and the corresponding previous first portions of the input are acquired at a second same point in time from at least the first register and the second register.

In accordance with implementations of the subject matter of this disclosure, a method for generating an indication of whether clock data recovery (CDR) circuitry of a transceiver is locked includes determining, using a frequency differential calculator, frequency differentials between a plurality of respective pairs of present first portions of the input to a digitally controlled oscillator (DCO) and corresponding previous first portions of the input to the DCO, determining, using the frequency differential calculator, an average of the frequency differentials for the plurality of respective pairs, and generating the indication of whether the CDR circuitry is locked based on the average.

In a first implementation of such a method, the frequency differentials may be based on a serial signal received by the transceiver, generating an indication that the CDR circuitry is locked may include determining that the transceiver is recovering data of the serial signal, and generating an indication that the CDR circuitry is unlocked may include adjusting timing associated with the DCO.

A second implementation of such a method may also include generating an input to the DCO, wherein generating the input includes subtracting the first portion from a second portion, wherein the first portion and the second portion are filtered outputs of time error detector circuitry, and adjusting an output associated with the DCO based on the input to the DCO.

A third implementation of such a method may also include decimating, using the frequency differential calculator, the first portion of the input to the DCO, wherein the frequency differentials are based on the decimated first portion of the input.

In a fourth implementation of such a method, determining the frequency differentials may include determining respective differentials between successive decimated first portions of the input to the DCO, and the method may further include registering each first output of the successive decimated outputs as a previous first portion and registering each second output of the successive decimated outputs as a present first portion.

In a fifth implementation of such a method, generating the indication may include incrementing the value of the first counter when the average is below a first threshold and generating the indication that the CDR circuitry is locked when the value of the first counter exceeds a lock threshold.

According to a first aspect of that fifth implementation of such a method, a value of a second counter may be incremented when the average is above a second threshold, wherein generating the indication may include generating an indication that the CDR circuitry is unlocked when the value of the second counter exceeds an unlock threshold.

According to a second aspect of that fifth implementation of such a method, the present first portions of the input may be acquired at a first same point in time from at least a first register of the DCO and a second register of the DCO, and the corresponding previous first portions of the input may be acquired at a second same point in time from at least the first register and the second register.

In accordance with implementations of the subject matter of this disclosure, an apparatus includes a host device configured to receive deserialized data from a transceiver, wherein the transceiver generates the deserialized data using clock data recovery (CDR) circuitry, and the transceiver includes a frequency differential calculator coupled to a first portion of an input to a digitally controlled oscillator (DCO) and configured to determine frequency differentials between a plurality of respective pairs of present first portions of the input to the DCO and corresponding previous first portions of the input to the DCO and to determine an average of the frequency differentials for the plurality of respective pairs, and circuitry configured to generate an indication of whether the CDR circuitry is locked based on the average.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
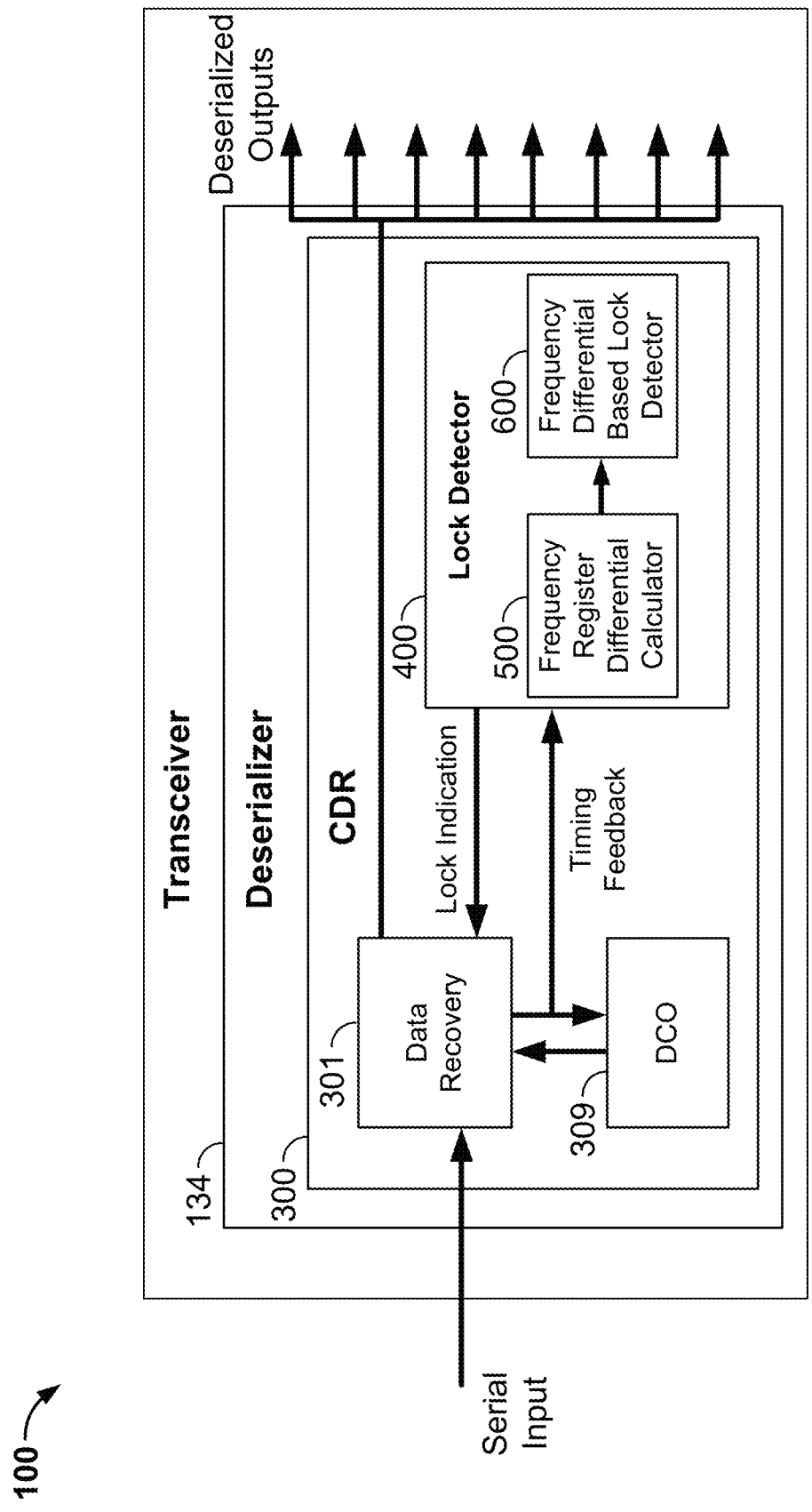
FIG. 1 is a block diagram of a serial data transceiver including a CDR lock detector based on frequency differentials in accordance with implementations of the subject matter of this disclosure.

Data serialization may include manipulating groups of data (e.g., bytes) such that those data groupings can be transmitted in a serial fashion (e.g., as a stream of bits). The serial data may be deserialized to reconstruct the original groups of data. In some implementations, data serialization may leverage high-speed communication systems to transmit large quantities of data with suitable speed and without loss of information.

A device that transmits serial data may serialize the data according to a particular encoding (e.g., at 112 Gb/s, or any other suitable rate). The encoding may include phase information to distinguish between respective groups of data in the incoming signal.

In order to decode received serial data, the receiver needs clock information of the received data. However, to save bandwidth, the clock information is not transmitted with the serial data.

Clock-data recovery (CDR) circuitry can determine the clock of the received serial data from the serial data itself, even though the clock is not transmitted with the data. As the name suggests, CDR circuitry may operate by recovering a clock timing of the serial data stream (e.g., to synchronize the receiving device clock with the transmitting device clock). This recovered clock timing, including phase information associated with the clock, is then used for sampling and recovering data of the serial data stream. In some implementations, CDR circuitry initially recovers clock information (e.g., to sample every serialized data bit) and then recovers phase information (e.g., to recover every byte or other suitable grouping of data).

CDR circuitry may include a lock detector that indicates when CDR circuitry has found, and locked itself to, the clock associated with an incoming signal. As used herein, a lock detector may refer to any device, circuitry, or other suitable component for determining whether a receiving device is locked onto (e.g., synchronized with clock and phase information) an incoming serial data stream.

In some implementations, timing error detector (TED) circuitry may be used in connection with a CDR lock detector. TED circuitry may determine an offset between a first timing associated with an incoming serial signal and a second timing associated with a sampling of the incoming serial signal. In some implementations, a CDR lock detector may, based on a mean and/or variation of the offset provided by TED circuitry, determine whether the CDR circuitry is locked. However, TED-based lock detection may not be sufficiently accurate or fast when handling an incoming signal with excess jitter, noise, or temporal shift between the transmitting and receiving devices.

In accordance with some implementations of the present disclosure, a CDR lock detector provides a lock indication based on frequency differentials (which may also be called frequency offsets), rather than timing error detection. For example, when the frequency differentials are sufficiently small, the lock detector determines that CDR circuitry is locked and parallel data streams of an incoming serialized signal are properly recovered by the CDR. Compared to a lock detector based on TED circuitry, implementations of the present disclosure may provide improved speed and/or robustness to jitter, noise, device variations, offsets between transmitting and receiving devices, or any combination thereof.

In some implementations of this disclosure, the frequency offsets are based on a signal coupled to a clock generation device (e.g., a digitally-controlled oscillator (DCO) or any other suitable oscillator or clock generator) of the CDR circuitry. This frequency difference signal may be filtered at least once, and in some implementations it may be decimated twice (e.g., second-order filtering via decimation), to generate the output of the lock detector.

In some implementations, the CDR lock detector supports how deserialization circuitry toggles between a training mode (e.g., where CDR circuitry is locking onto the clock of an incoming signal) and a data recovery mode (e.g., where CDR circuitry has already locked to the clock and is recovering serialized data of the incoming signal). Supporting this toggling with improved speed and robustness to the abovementioned error sources supports the speed and accuracy of data deserialization.

In some implementations, the CDR lock detector includes frequency register differential circuitry for determining the frequency differentials and a frequency differential-based lock detector for determining whether CDR circuitry is locked based on the frequency differentials. The frequency register differential circuitry may include a first decimator to decimate (i.e., down-sample) a stream of frequency differentials (e.g., corresponding to the stream of incoming data). The differential-based lock detector may determine an average (e.g., a moving average or any other suitable approach for determining a dynamic average across a desired number of samples) using a second decimator, may increment at least one counter based on the average, and may determine whether the CDR circuitry is locked based on a value of the counter.

The subject matter of this disclosure may be better understood by reference to FIGS. 1-10.

FIG. 1 is a block diagram of a portion of serial data transceiver 100 that illustrates details of the subject matter of this disclosure. Serial data transceiver includes deserializer 134 and CDR 300, as further described below. CDR 300 includes data recovery circuitry 301, which samples and recovers data from an incoming serial input signal, as shown by the bold arrows indicating data flows. When recovering the data, data recovery circuitry 301 receives timing signals from DCO 309 and provides timing feedback to DCO 309. The timing feedback causes DCO 309 to adjust the timing signals such that the data recovery circuitry 301 locks onto the serial input (e.g., samples data of the serial input with a timing that aligns with phase offsets that were previously used to serialize multiple parallel data streams to create the serial data being received).

In accordance with some implementations of this disclosure, the timing feedback signal is also coupled to lock detector 400. At a high level, lock detector 400 may rely on frequency differentials (e.g., as opposed to timing differentials) to generate a lock indication to data recovery circuitry 301. Frequency register differential calculator 500 of lock detector 400 calculates these frequency differentials as are associated with the timing feedback signal. Performing this calculation may include a first filtering of the feedback signal, and that first filtering may be a decimation. The calculated frequency differentials are provided to frequency differential based lock detector 600, which provides a lock indication to data recovery circuitry 301 based on the frequency differentials. Providing this lock indication may include a second filtering of the feedback signal, and that second filtering may also be a decimation. Providing this lock indication may also include an averaging of the once- or twice-filtered signal. Frequency differential based lock detector 600 may be configured such that when the average frequency differentials are below a threshold, the lock indicator informs that the data recovery circuitry 301 is locked; when the average frequency differentials are above a threshold, the lock indicator informs that the data recovery circuitry 301 is unlocked.

Data recovery circuitry 301 generates deserialized outputs (e.g., eight or any other suitable number of outputs) from the serial input. In some implementations, based on the lock indication, data recovery circuitry 301 operates in one of a training mode (e.g., where the circuitry is attempting to lock onto the serial input and the deserialized outputs are not generated) or a data recovery mode (e.g., where the circuitry is locked onto the serial input and the deserialized outputs are generated). By rapidly providing the lock indication with minimal sensitivity to error sources, lock detector 400 supports rapid transitions from the training mode to the data recovery mode and thereby supports rapid operation of CDR 300.

The deserialized outputs may be provided to other components of transceiver 100 (e.g., to receive circuitry 102) and/or they may be provided to a locally-situated host device (e.g., host 110), as further described below at least in connection with FIG. 2.

Figure 2:
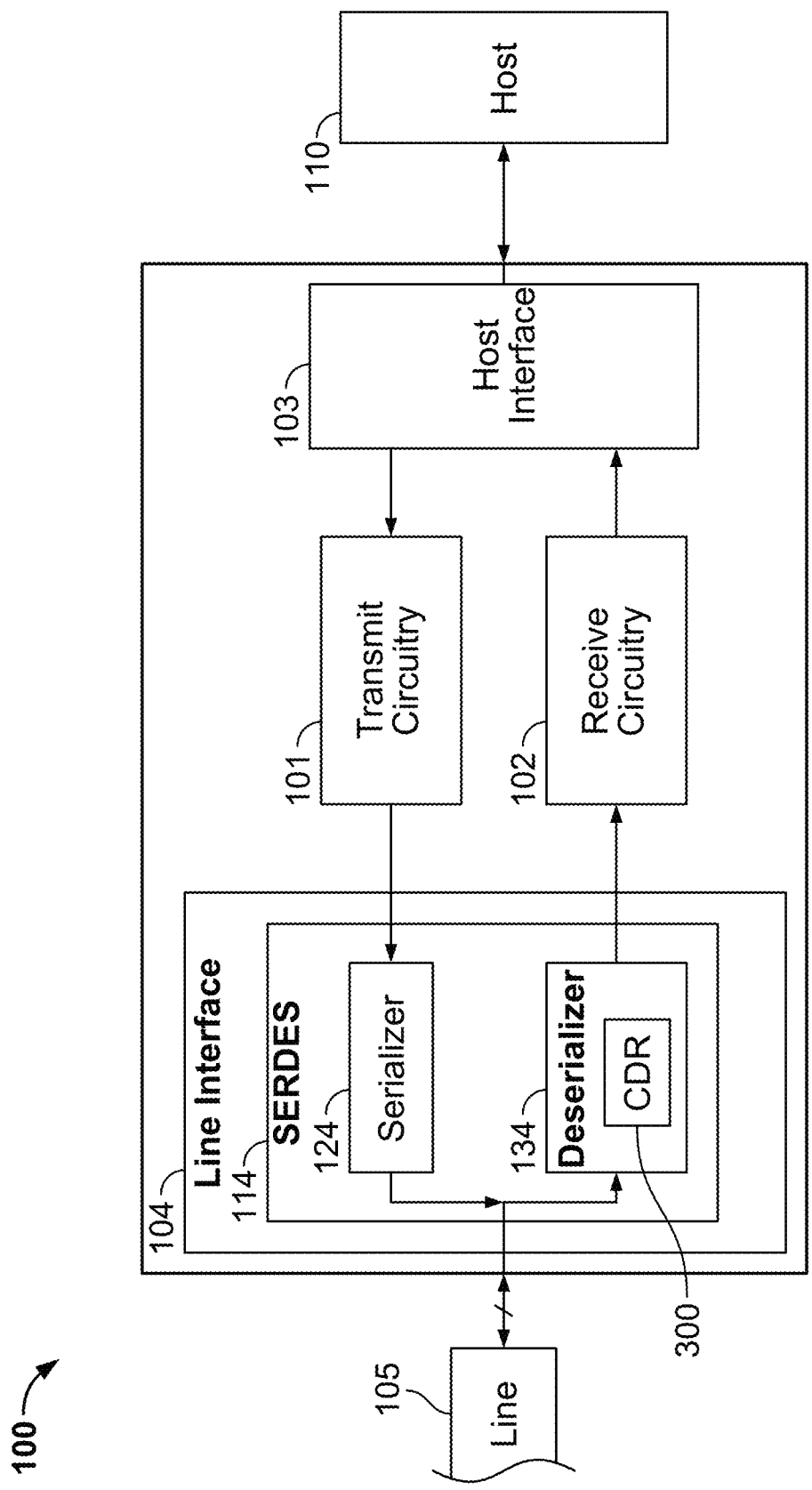
FIG. 2 is a high-level block diagram of a serial data transceiver configured in accordance with implementations of the subject matter of this disclosure.

FIG. 2 is a high-level block diagram of a processor or network device showing additional details of serial data transceiver 100. Transceiver 100 may include transmit circuitry 101, which is configured to send data to serializer 124 and receive circuitry 102, which is configured to receive data from deserializer 134. As described above, serializer 124 may serialize a data stream (e.g., for subsequent transmission) and deserializer 134 may deserialize a data stream (e.g., for subsequent reproduction of received data). CDR circuitry 300 is included within deserializer 134 for determining the clock of the incoming data stream, and CDR circuitry 300 may incorporate implementations of the subject matter of this disclosure to determine when CDR circuitry 300 is locked to that clock, as further described below.

Serial data transceiver 100 is communicatively coupled to line 105 (e.g., which may represent any suitable transmission medium, including a copper or fiber cable, or any suitable wireless channel). Line interface 104 of serial data transceiver 100 is configured for two-way communicative coupling to line 105, meaning that line interface 104 may send data (e.g., from serializer 124) to line 105 or line interface 104 may receive data (e.g., into deserializer 134) from line 105, as shown by the data flow paths connected to line 105, serializer 124, and deserializer 134. Line interface 104 may include serializer/deserializer (SERDES) circuitry 114, which includes at least serializer 124 and deserializer 134.

Serial data transceiver 100 also includes host interface 103 for communication with locally-situated host device 110. Host device 110 may be configured to send and receive one data stream or parallel data streams over line 105, meaning that deserializer 134 (and CDR circuitry 300) may be configured to deserialize and recover data from one stream or from multiple streams received in parallel. For example, multiple registers (e.g., within frequency register 310) may receive a corresponding number of incoming signals at the same point in time, and deserializer 134 may process each of these signals in parallel.

Figure 3:
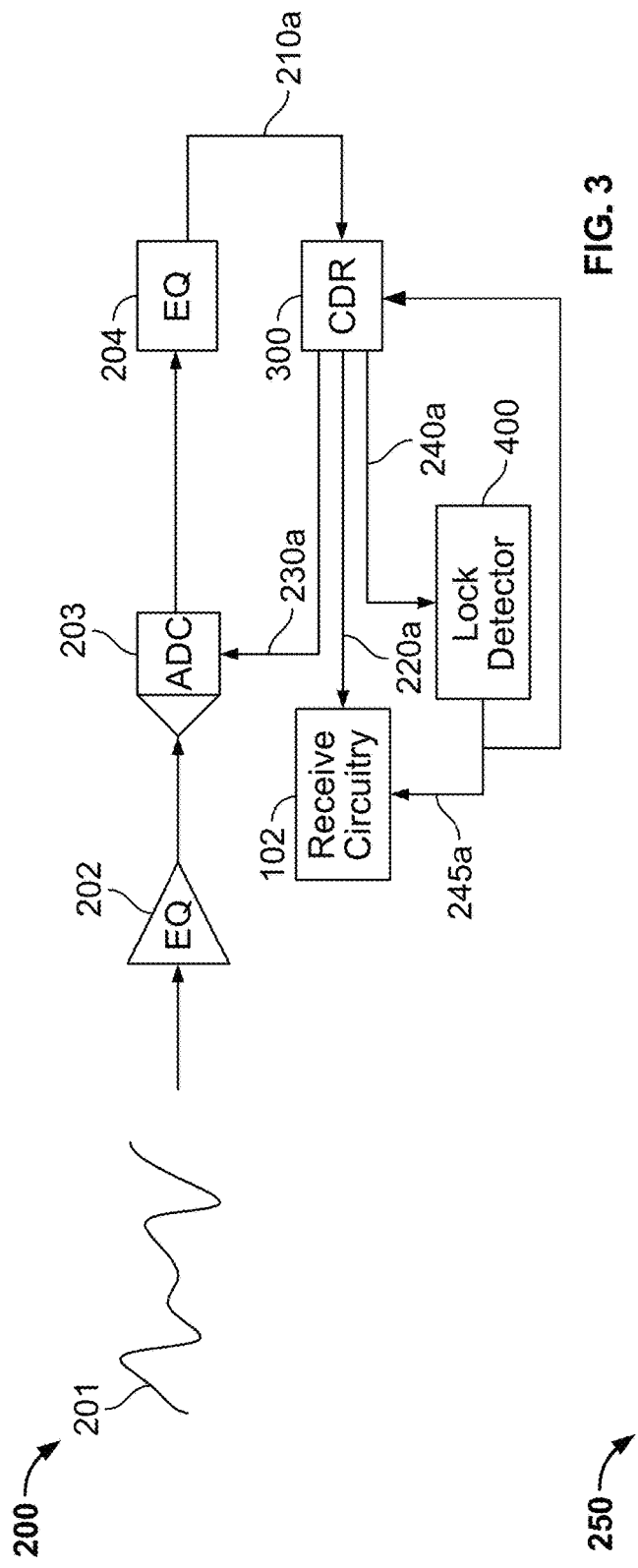
FIG. 3 is a block diagram of a digital deserialization circuit configured in accordance with implementations of the subject matter of this disclosure.
Figure 4:
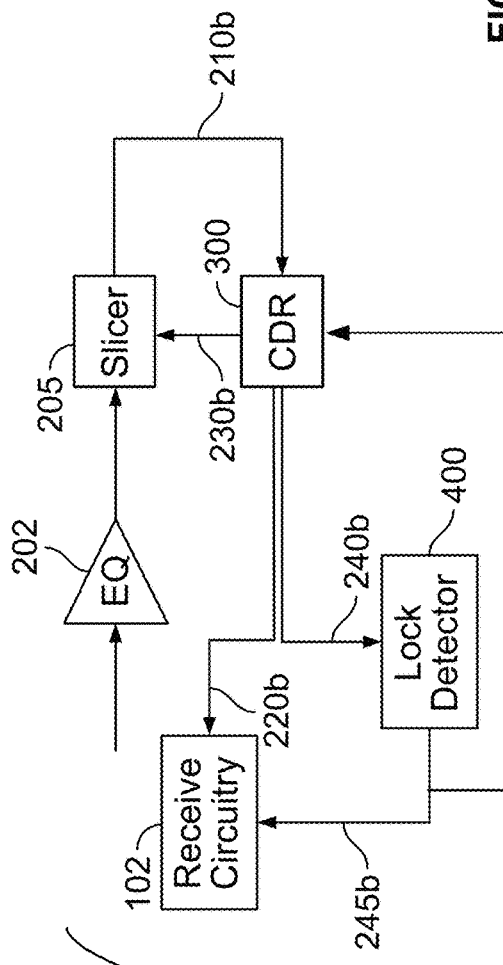
FIG. 4 is a block diagram of an analog deserialization circuit configured in accordance with implementations of the subject matter of this disclosure.

FIG. 3 shows, at a high level, a possible digital implementation of deserializer 134. FIG. 4 shows, at a high level, a possible analog implementation of deserializer 134. Block diagram 200 represents a digital implementation of deserializer 134 and block diagram 250 represents an analog implementation of deserializer 134, both of which include CDR circuitry 300 and may be consistent with implementations of this disclosure. While CDR circuitry 300 is shown as being distinct from other circuit blocks of FIGS. 3 and 4, equalizer (EQ) 202, analog-to-digital converter (ADC) 203, EQ 204, slicer 205, lock detector 400, or any combination thereof, can, in some implementations, be considered components of CDR circuitry 300.

Signal 201 represents any suitable incoming and serialized data stream. There may be a particular rate (e.g., 112 Gb/s) associated with signal 201, and there may also be particular phase information (e.g., corresponding to respective streams of parallel data streams) associated with signal 201. In both implementations 200 and 250, the incoming signal is filtered by EQ 202 (e.g., to remove noise or otherwise condition the incoming signal for processing). Then, clock information (e.g., phase) is extracted from the filtered incoming signal 201 by CDR circuitry 300. For example, the clock information may be extracted based on phase interpolation in CDR circuitry 300, which provides timing signals associated with the phases of the clock. In digital implementation 200, ADC 203 (e.g., a 1-bit ADC or any other suitable sampler) determines a binary output for each unit interval (e.g., each clock cycle, which may correspond to each bit) at which ADC 203 samples the filtered input signal 201. In analog implementation 250, slicer 205 determines an analog output (which, e.g., may be a clipped or unclipped signal, or any other suitable analog representation of the sampled information) for each unit interval at which slicer 205 samples the filtered input signal 201.

CDR circuitry 300 receives the output of ADC 203 (with additional filtering by equalizer 204), as indicated by signal 210a, or the output of slicer 205, as indicated by signal 210b. CDR circuitry 300 then operates (as described at least in connection with FIG. 5) to recover the clock data of input signal 201 and to couple the recovered clock data to receive circuitry 102 (as indicated by signals 220a and 220b). Moreover, to cause ADC 203 or slicer 205 to properly extract information from the incoming data 201, CDR circuitry 300 feeds another output (as indicated by signals 230a and 230b) back to the ADC or slicer. Based on the output 230a or 230b, CDR circuitry 300 may modify phase information (e.g., based on adjusting an output of a DCO of the CDR circuitry, or adjusting interpolation by a phase interpolator of the CDR circuitry) associated with how ADC 203 or slicer 205 processes the filtered input signal 201, such that CDR circuitry 300 may properly recover the clock information of the input signal.

Yet another output of CDR circuitry 300 (as indicated by signals 240a and 240b) is coupled to lock detector 400, in accordance with implementations of the subject matter of this disclosure. Lock detector 400 processes frequency differentials between present and previous values (e.g., based on these values being stored at frequency register 310 and provided as frequency register output 401 to frequency register differential calculator 500) of its input signal. As used herein with reference to a present value (or input, or portion of an input), a corresponding previous value (or input, or portion of an input) may refer to the particular previous value that is compared against the present value for determining a respective frequency differential. The exact number of inputs and/or the exact timing difference between a present value and a corresponding previous value may be determined by a first decimation factor (e.g., as set at decimator 502) of lock detector 400, as further described below. Lock detector 400 determines whether CDR circuitry 300 is locked based on one or more averages of multiple frequency differentials. For example, frequency-differential-based lock detector 600 may calculate the averages using adder 601, decimator 602, and divider 604, and frequency-differential-based lock detector 600 may determine whether CDR circuitry 300 is locked based on lock detector state machine 610 comparing the calculated averages to one or more threshold.

In some implementations, as shown in FIGS. 3 and 4, lock detector 400 provides signal 245a or 245b (e.g., the indication of whether CDR circuitry 300 is locked) to receive circuitry 102 (e.g., to cause receive circuitry 102 to process or otherwise operate on the recovered data). In some implementations, as also shown in FIGS. 3 and 4, lock detector 400 may provide signal 245a or 245b to CDR circuitry 300 (e.g., to modify how CDR circuitry 300 generates output 230a or 230b).

CDR lock detector 400 is depicted as being discrete from CDR circuitry 300, but this is merely for illustrative purposes. CDR lock detector 400 can, in some implementations, be considered a part of CDR circuitry 300.

Figure 5:
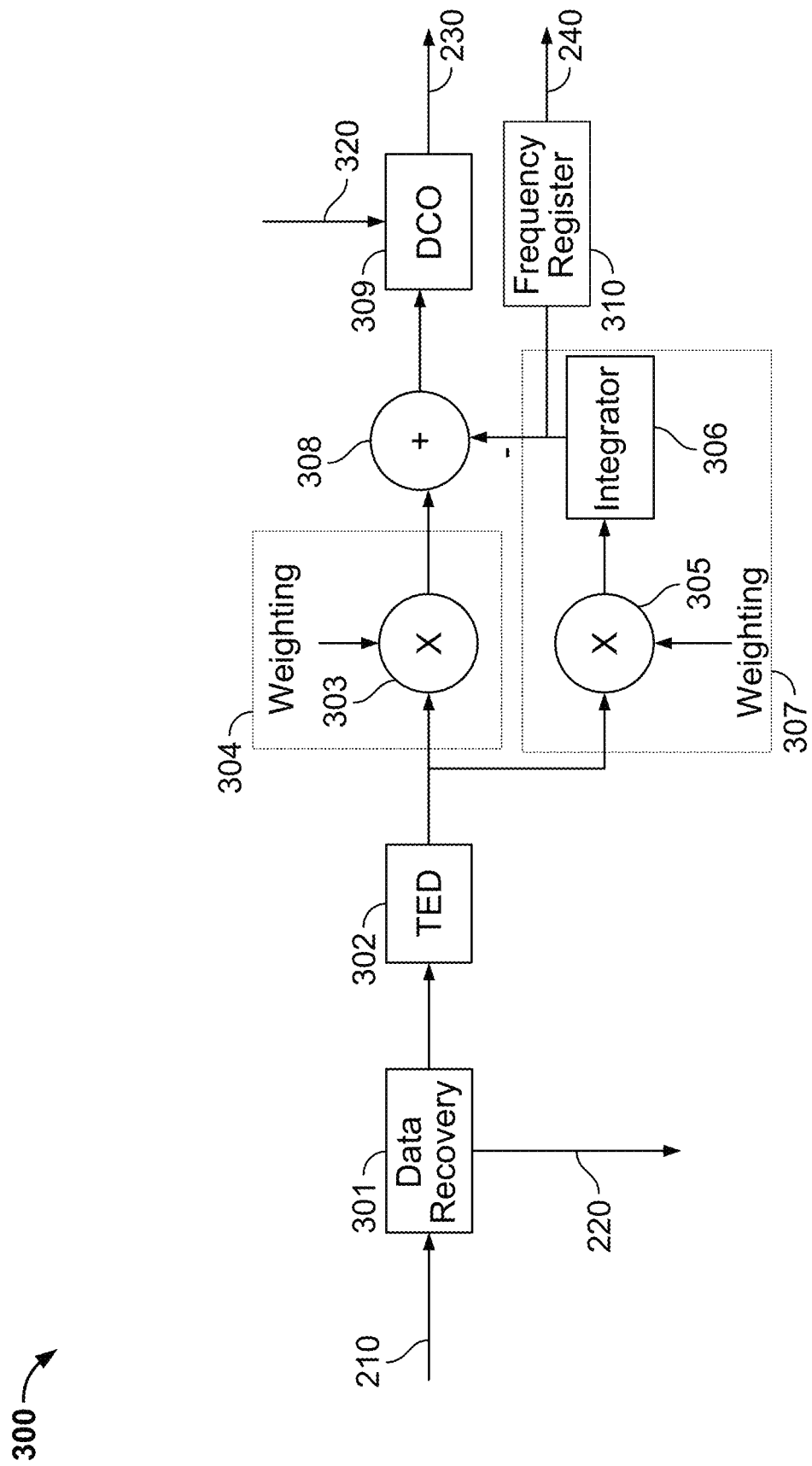
FIG. 5 is a block diagram of CDR circuitry configured in accordance with implementations of the subject matter of this disclosure.

FIG. 5 is a block diagram of CDR circuitry 300 in accordance with some implementations of the subject matter of this disclosure. As shown and described in connection with FIG. 5, signal 210 may refer to either of signals 210a or 210b, and the same is true for signals 220, 230, and 240 and their corresponding representations in FIGS. 3 and 4.

CDR circuitry 300 includes data recovery circuitry 301 and timing recovery circuitry, which includes all the components to the right of data recovery 301. The timing recovery circuitry includes TED circuitry 302, the output of which is coupled to proportional path 304 and integral path 307. Proportional path 304 includes multiplier 303, which multiplies the output of TED circuitry 302 by a first weighting. Integral path 307 includes multiplier 305, which multiplies the output of TED circuitry by a second weighting and integrates the output of multiplier 305 at integrator 306. For example, the first and second weightings may be set to normalize the magnitudes of the signals through the proportional path 304 and the integral path 307, such that both paths suitably influence the output of adder 308.

The output of adder 308 couples to DCO 309. This output includes the output of the proportional path 304 (e.g., the second portion of the input to DCO 309) and the output of the integral path 306 (e.g., the first portion of the input to DCO 309), which are combined at adder 308. In this addition operation, the first portion of the input is negated, as indicated by the "-" sign; thus, the input to DCO 309 includes the first portion of the input subtracted from the second portion of the input. Based on this input to the DCO 309, timing signal 230 is generated to control when serial input signal 201 is sampled (e.g., by ADC 203 or slicer 205) to align with phase offsets that were previously used to serialize multiple parallel data streams to create the serial data being received. The input to DCO 309 may modify a phase of the output of DCO 309, adjusting the timing associated with how the parallel data streams are sampled and permitting accurate reproduction of these parallel data streams in the deserialized outputs of data recovery circuitry 301.

Feedback signal 320 couples to DCO 309 and adjusts an output of DCO 309. Feedback signal 320 may be based on an output of TED 302, a value of the input to DCO 309 (e.g., the difference between the output of proportional path 304 and the output of integral path 307), or any other suitable information. Adjusting the output of DCO 309 modifies when ADC 203 or slicer 205 samples the input signal 201 to better align this sampling with phase offsets that were previously used to serialize multiple parallel data streams to create the serial input data being received.

CDR circuitry 300 also includes frequency register 310. Frequency register 310 stores time-dependent frequency values for signal 240 (which, it is noted, may be the same at the input and the output of frequency register 310) and provides frequency register output 401 as shown and described at least in connection with FIGS. 5 and 6. In some implementations, CDR circuitry 300 processes multiple signals (e.g., in parallel, based on a parallelized serialization of an input signal), and frequency register 310 includes respective registers for storing respective frequencies associated with each one of the parallel signals.

With reference to FIGS. 3 and 4, the output (e.g., signal 240) of integrator 306 is additionally coupled to lock detector 400. Lock detector 400 may determine a series of frequency differentials between present and corresponding previous values of signal 240, consistent with the prior descriptions of these temporally-dependent signals and the subsequent descriptions provided at least in connection with FIGS. 5-7. Because lock detector 400 operates on frequency differentials derived from signal 240, and signal 240 is coupled to DCO 309, lock detector 400 operates based on frequency differentials derived from the DCO 309 loop of CDR circuitry 300. In some implementations, these frequency differentials are based on second-order filtering (e.g., including a first filter at TED 302 and a second filter at integral path 307, or including a first filter at decimator 502 and a second filter at decimator 602) of the DCO 309 loop.

Figure 6:
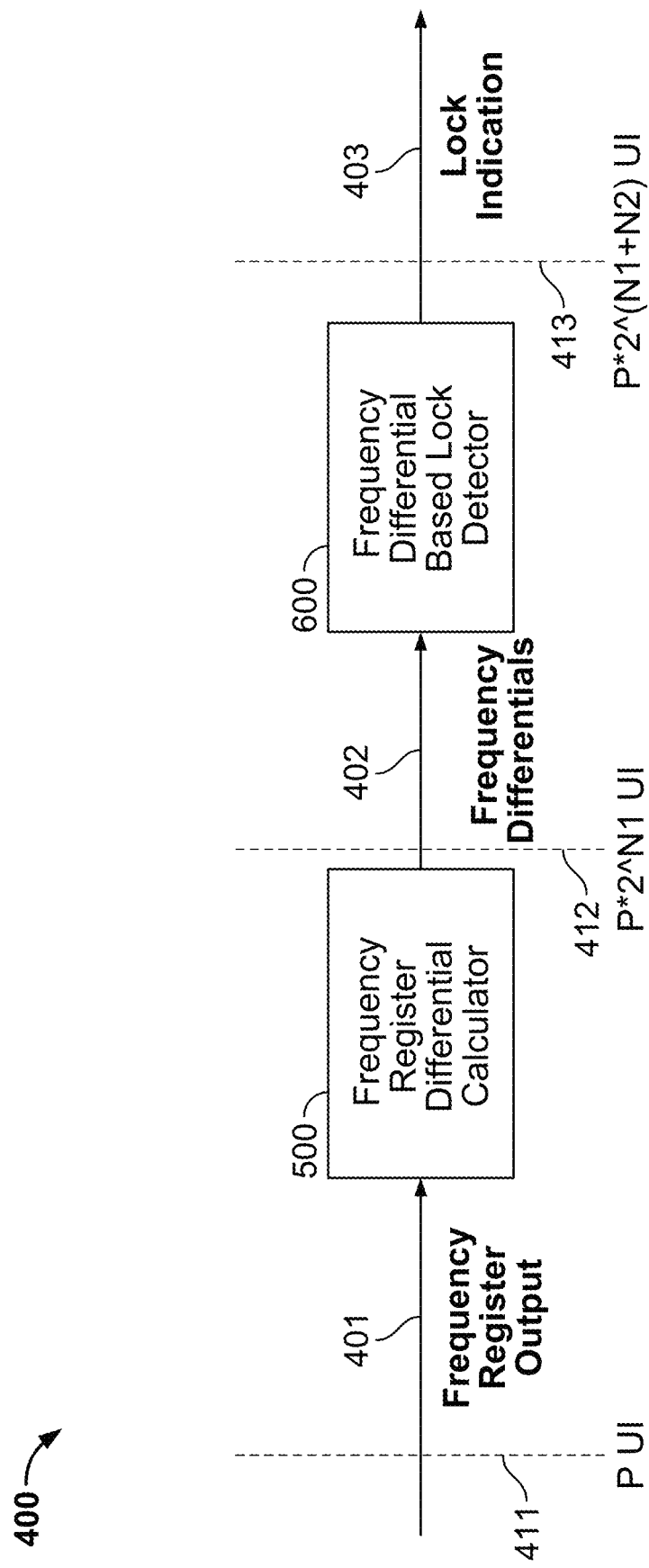
FIG. 6 is a block diagram of CDR lock detector circuitry configured in accordance with implementations of the subject matter of this disclosure.

FIG. 6 is a high-level block diagram of CDR lock detector 400 that represents one possible implementation of this disclosure. CDR lock detector 400 includes frequency register differential calculator 500 (e.g., a frequency differential calculator) and frequency differential based lock detector 600.

Figure 7:
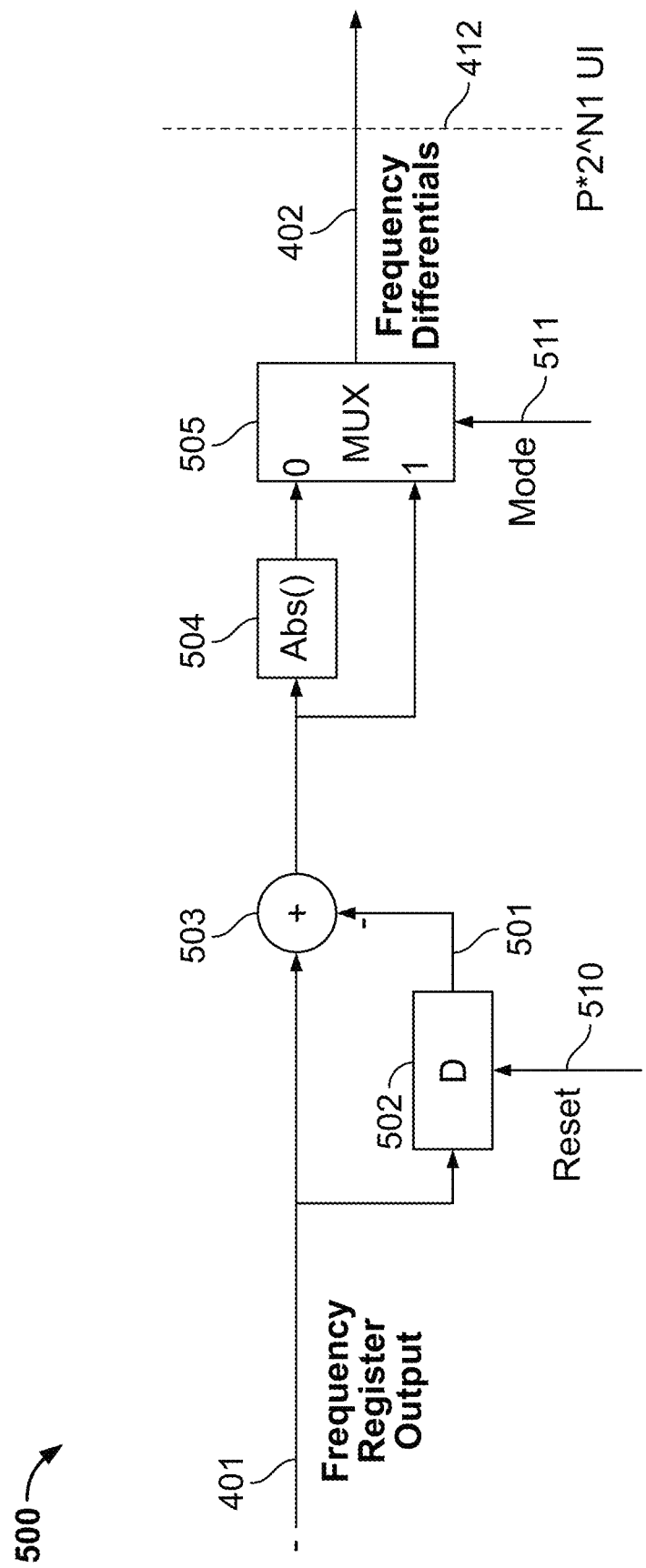
FIG. 7 is a block diagram of a frequency differential calculator configured in accordance with implementations of the subject matter of this disclosure.

Frequency register output 401 is input to frequency register differential calculator 500, which determines a plurality of frequency differentials based on the frequency register output 401, as further described at least in connection with FIG. 7. In some implementations, frequency register output 401 corresponds to signal 240 (e.g., a frequency register may be configured to store signal 240 and to couple it to frequency register differential calculator 500).

Timing indicator 411 shows how frequency register output 401 may be provided every "P" unit intervals (UI), where P represents a number of parallel signal paths. For example, P may be any positive integer. When P is greater than 1, it may indicate that a corresponding number of ADCs 203 or slicers 205 are implemented in deserializer 134, that a single ADC 203 or slicer 205 with a corresponding number of parallel paths is implemented in deserializer 134, or a combination thereof.

Timing indicator 412 shows how the plurality of frequency differentials 402 may be provided every $P \times 2^{N1}$ unit intervals, where N1 represents a first decimation factor associated with frequency register differential calculator 500.

The plurality of frequency differentials 402 generated by frequency register differential calculator 500 are coupled to frequency differential based lock detector 600. Based on the signal flows shown in FIG. 8, frequency differential based lock detector 600 calculates averages from the plurality of frequency differentials 402 and applies logic of lock detector state machine 610 to determine whether CDR circuitry 300 is locked based on the calculated averages. Frequency differential based lock detector 600 generates lock indication 403, which is the indication of whether CDR circuitry 300 is locked. In some implementations, lock indication 403 corresponds to signal 245a or 245b.

Timing indicator 413 shows how the lock indication 403 may be provided every $P \times 2^{(N1+N2)}$ unit intervals, where N2 represents a second decimation factor associated with frequency differential based lock detector 600.

FIG. 7 is one possible implementation of frequency register differential calculator 500. Frequency register differential calculator 500 provides frequency register output 401 (e.g., a present first portion of the input to DCO 309) and decimated frequency register output 501 (e.g., a corresponding previous first portion of the input to DCO 309) to adder 503, where the present and previous frequency register outputs 401 are added. Because the decimated frequency register output 501 is negated (as indicated by the "-" sign), adder 503 effectively performs a subtraction operation to generate the plurality of frequency differentials between the present and previous frequency register outputs 401.

Decimator 502 decimates frequency register output 401 according to decimator control signal 510. Decimator control signal 510 may establish a decimation factor N1 associated with the operation of decimator 502. For example, if N1=10, it would mean that the frequency register output 401 is decimated by a factor of 10 (e.g., nine out of every ten frequency register outputs 401 are discarded, such that one out of every ten frequency register outputs 401 is evaluated at adder 503 to generate the corresponding frequency differential) at decimator 502. A value for N1 may be included in control signal 510. Control signal 510 may also include an indicator to reset decimator 502 (e.g., to a default decimation factor). The decimator 502 effectively serves as a low-pass filter, with the value of N1 (or similarly, the decimation factor) corresponding to a spacing between the pair of values used to determine the frequency differential. This sample spacing effectively serves as a cut-off frequency of the low-pass filtering that occurs at decimator 502. This low-pass filtering limits the extent to which high-frequency fluctuations (e.g., which may be spurious, stochastic, or otherwise not suitably representative of a locked or unlocked state of CDR 300) in the frequency differentials 402 influence generation of the lock indication.

The remainder of this possible implementation of frequency register differential calculator 500 includes an absolute (Abs) value generator 504 and a multiplexer (MUX) 505. Based on the value of MUX control signal 511, absolute value generator 504 is either used (e.g., when control signal 511 is equal to 0) to generate frequency differentials 402 (i.e., the frequency differentials are absolute values) or is bypassed (e.g., when control signal 511 is equal to 1) to generate frequency differentials 402 that may be positive or negative. In some implementations, the absolute value generator 504 is used to reduce the likelihood of a false-positive lock detection caused by respective frequency differentials 402 being roughly evenly distributed around an average value close to zero.

Figure 8:
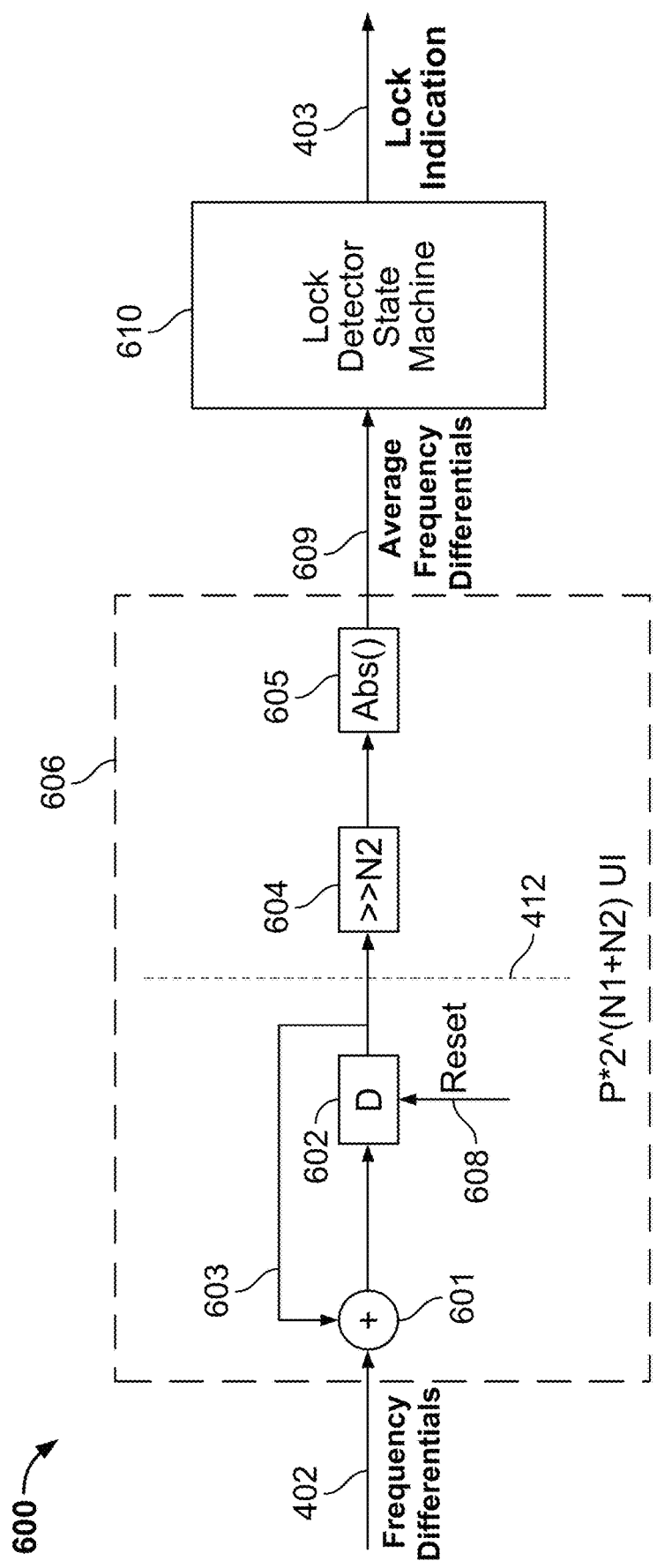
FIG. 8 is a block diagram of circuitry for averaging outputs of the frequency differential calculator configured in accordance with implementations of the subject matter of this disclosure.

FIG. 8 is one possible implementation of frequency differential based lock detector 600. Frequency averaging circuitry 606 of frequency differential based lock detector 600 is for generating average frequency differentials 609 based on the frequency differentials 402, and lock detector state machine 610 is for generating lock indication 403 based on the frequency differentials 609.

An illustrative implementation of frequency averaging circuitry 606 is described as follows. First, respective frequency differentials 402 are added at adder 601. The output of adder 601 is decimated by decimator 602. Decimator control signal 608 may establish a decimation factor associated with the operation of decimator 602, including a value for N2. The value of N2 corresponds to a period over which the average is taken and thus is proportional to a cut-off frequency of the low-pass filtering operation at decimator 602. Control signal 608 may also include an indicator to reset decimator 602 (e.g., to a default decimation factor). The output of decimator 602 is divided by N2 at divider 604 to generate an average. Absolute value generator 605 takes the absolute value of this average, and this absolute value becomes a respective average frequency differential 609, as used by lock detector state machine 610. Signal 603, as output by decimator 602, is also fed back to adder 601. As further described at least in connection with method 700, lock detector state machine 610 may generate lock indication 403 based on comparing each average frequency differential 609 to a frequency differential threshold, incrementing a counter when the respective average is below the frequency differential threshold, and generating an indication that the CDR 300 is locked when the counter is above a lock threshold.

Figure 9:
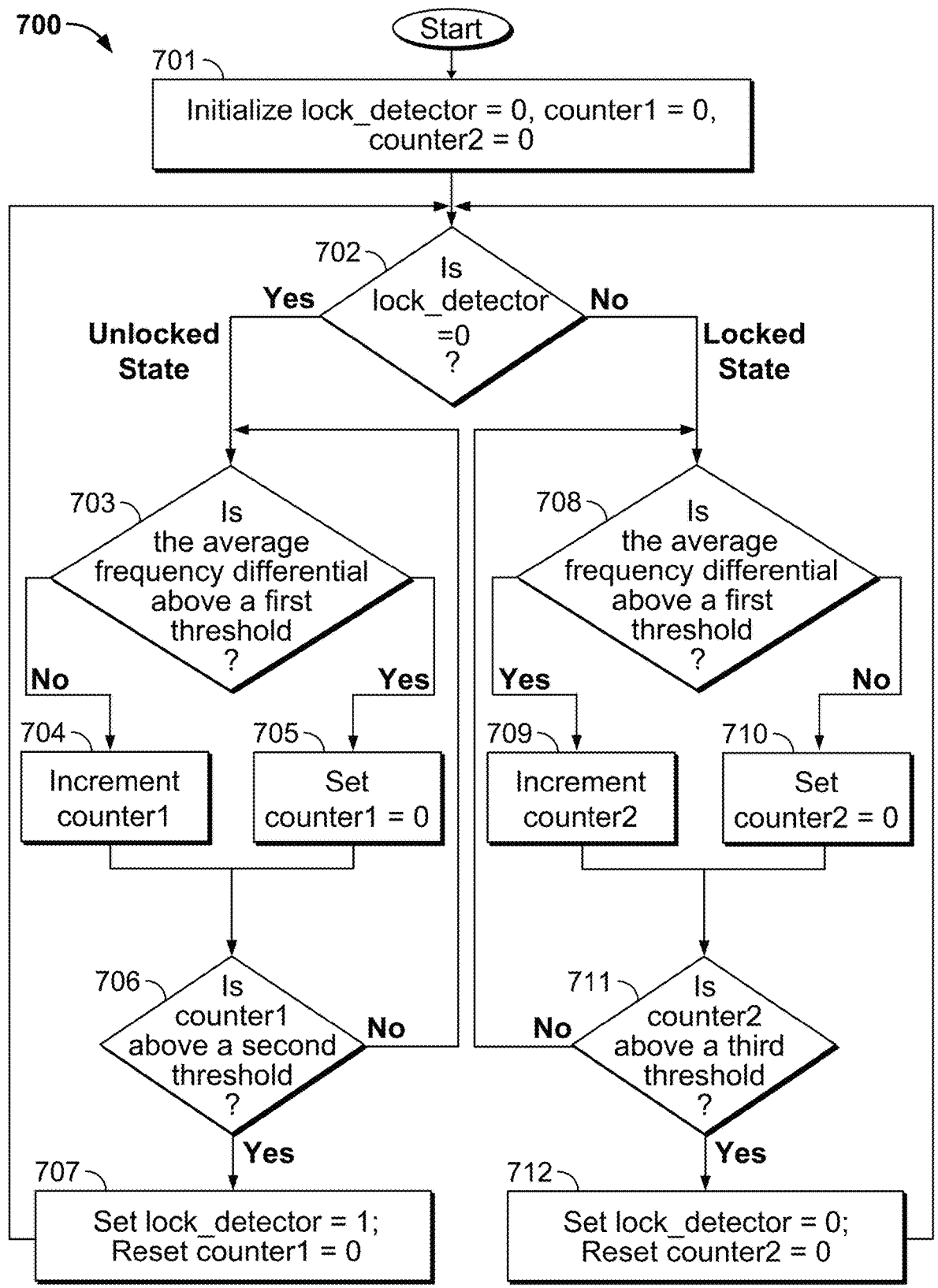
FIG. 9 is a flow diagram illustrating a method, in accordance with implementations of the subject matter of this disclosure, for determining whether CDR circuitry is locked.

FIG. 9 illustrates a method 700 for generating an indication of whether CDR circuitry 300 is locked. In some implementations, method 700 is executed by lock detector state machine 610 to generate lock indication 403. In some implementations, lock indication 403 corresponds to the lock detector variable (e.g., as shown in connection with the operations at 701, 705, and 708). It is noted that counter1 and counter2 may respectively be referred to as first and second counters.

At initialization 701, method 700 includes initializing lock_detector=0, counter1=0, and counter2=0. At 702, it is determined whether lock_detector=0. As shown by the labelling of FIG. 9, with lock_detector=0, the CDR circuitry is in the Unlocked State and method 700 proceeds with the actions on the left side of FIG. 9. Accordingly, at 703, it is determined whether the average frequency differential (e.g., a respective value of average frequency differentials 609) is above a first threshold. The first threshold may correspond to a single value or range, below which the CDR circuitry 300 is at least temporarily locked and above which the CDR circuitry 300 is at least temporarily unlocked.

If at 703, it is determined that the average frequency differential is not above the first threshold, then at 704, counter1 is incremented. However, if at 703 it is determined that the average frequency differential is above the first threshold, then at 705, counter1 is set to '0'. After either of the actions at 704 or 705, at 706, it is determined whether counter1 is above a second threshold. The second threshold may indicate, for instance, an amount of time after which, having been at least temporarily locked, CDR circuitry 300 is determined to be locked. If counter1 is determined to be above the second threshold at 706, then at 707 lock_detector is set to '1' (i.e., generating an indication that CDR circuitry is locked), counter1 is reset to '0', and method 700 proceeds (after a corresponding determination at 702) with the Locked State actions. However, if at 706, counter1 is determined to not be above the second threshold, then method 700 returns to 703 to evaluate additional average frequency differentials.

With lock_detector=1 (e.g., after the action at 707), the CDR circuitry is in the Locked State and method 700 proceeds with the actions on the right side of FIG. 9. Accordingly, it is determined at 708 whether the average frequency differential is above the first threshold. If at 708, it is determined that the average frequency differential is above the first threshold, then at 709, counter2 is incremented. However, if at 708, it is determined that the average frequency differential is not above the first threshold, then at 710, counter2 is set to '0'. After either of the actions at 709 or 710, at 711, it is determined whether counter2 is above a third threshold. The third threshold may indicate an amount of time after which, having been at least temporarily unlocked, CDR circuitry 300 is determined to be unlocked. If at 711, counter2 is determined to be above the third threshold, then at 712 lock_detector is set to '0' (i.e., generating an indication that CDR circuitry is unlocked), counter2 is reset to '0', and method 700 proceeds (after a corresponding determination at 702) with the Unlocked State actions. However, if at 711, counter2 is determined to not be above the second threshold, then method 700 returns to 708 to evaluate additional average frequency differentials.

Figure 10:
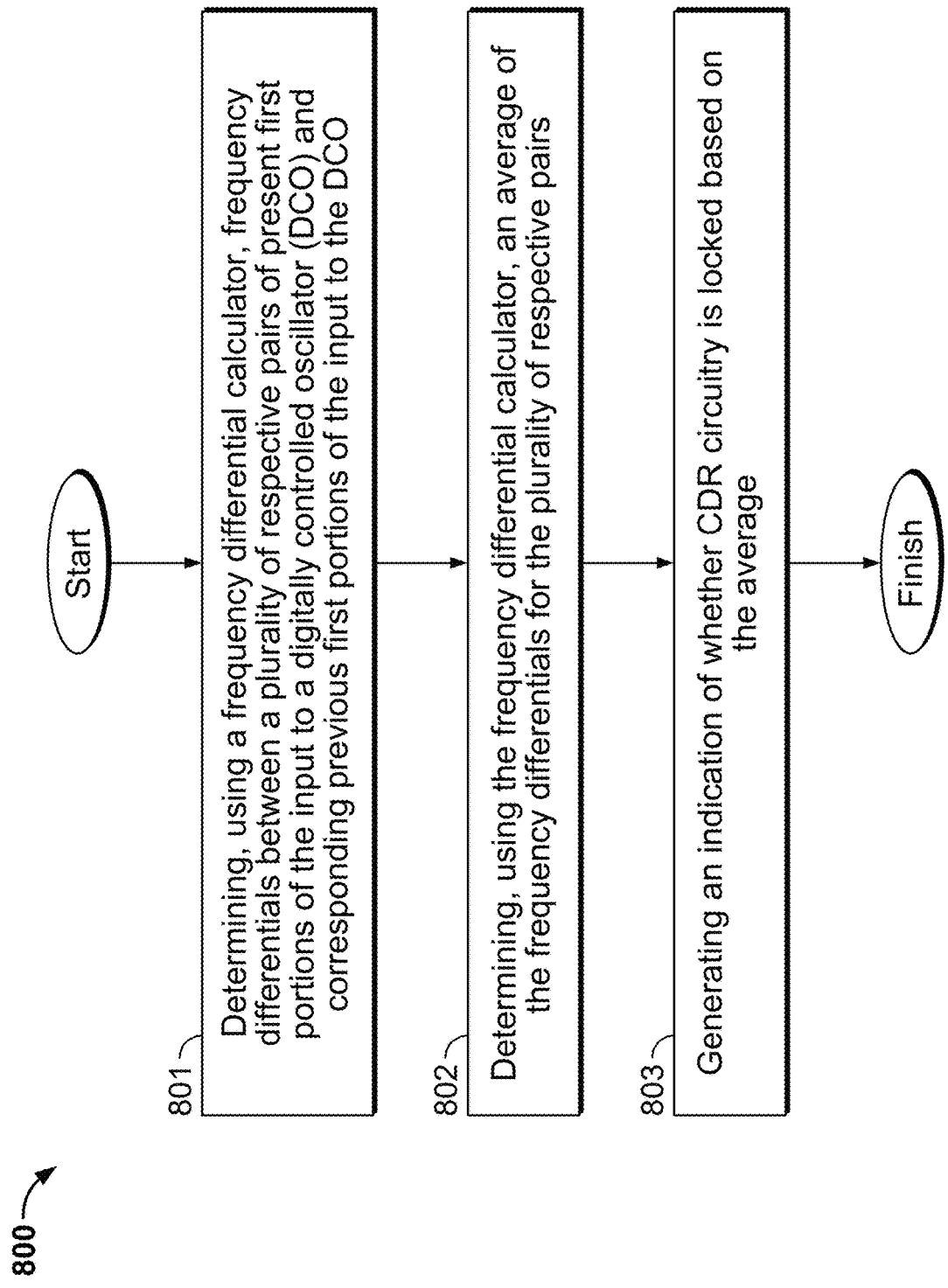
FIG. 10 is a flow diagram of a method, in accordance with implementations of the subject matter of this disclosure, for generating an indication of whether CDR circuitry is locked.

FIG. 10 illustrates a method 800 for generating an indication of whether CDR circuitry (e.g., CDR circuitry 300) is locked. In some implementations, method 800 is executed by serial data transceiver 100 (e.g., on a network device including serial data transceiver 100). In some implementations, method 800 is executed according to the block diagram of FIG. 6.

At 801, circuitry frequency differentials (e.g., frequency differentials 402)—between a plurality of respective pairs of present first portions of the input to a digitally controlled oscillator (DCO) (e.g., frequency register output 401) and corresponding previous first portions of the input to the DCO (e.g., decimated frequency register output 501)—are determined using a frequency differential calculator (e.g., frequency register differential calculator 500).

At 802, an average (e.g., average frequency differentials 609) of the frequency differentials for the plurality of respective pairs is determined using the frequency differential calculator. In some implementations, method 800 includes determining a plurality of averages (each corresponding to a respective plurality of frequency differentials 402).

At 803, based on the average, an indication is generated of whether the CDR circuitry is locked. In some implementations, the indication may indicate that the CDR circuitry is locked (e.g., corresponding to the operations at 707) or the indication may indicate that the CDR circuitry is unlocked (e.g., corresponding to the operations at 712).

Method 800 can also include coupling the lock indication to a host (e.g., host 110).

The frequency differentials can be based on a serial signal received by a transceiver (e.g., serial data transceiver 100), generating an indication at 803 that the CDR circuitry is locked can include determining that the transceiver (e.g., CDR circuitry 300 of the transceiver) is recovering data of the serial signal, and generating an indication at 803 that the CDR circuitry is unlocked can include adjusting a timing associated with a DCO (e.g., where the DCO determines how data of the incoming serial signal is sampled or otherwise retrieved).

Method 800 can also include generating an input to a DCO, where generating the input includes subtracting (e.g., at adder 308) the first portion (e.g., signal 240, or the output of integral path 307) from a second portion (e.g., the output of proportional path 304), wherein the first portion and the second portion are filtered outputs of time error detector circuitry 302. Method 800 can also include adjusting a timing associated with the DCO based on the input to the DCO.

Method 800 can also include decimating (e.g., using decimator 502) the first portion of the input to the DCO, wherein the frequency differentials are based on the decimated first portion of the input. Method 800 can also include decimating (e.g., using decimator 602) the average at 802. Method 800 can also include, based on the two aforementioned decimating steps, second-order filtering the first portion of the input to the DCO.

Determining frequency differentials at 801 can include determining absolute values (e.g., using absolute value generator 504) of the frequency differentials. Determining the average at 802 can include determining the absolute value (e.g., using absolute value generator 605) of the average.

Determining the frequency differentials at 801 can include determining respective differentials between successive decimated first portions of the input to the DCO. Method 800 can also include registering (e.g., at frequency register 310) each first output (e.g., decimated frequency register output 501) of the successive decimated outputs as a previous first portion and registering each second output (e.g., frequency register output 401) of the successive decimated outputs as a present first portion.

Generating the indication at 803 can include examining (e.g., consistent with the determination at 706) value of a first counter (e.g., counter1, as described in connection with method 700) and incrementing the value of the first counter when the average is below a first threshold (e.g., consistent with the operations at 703 and 704), wherein generating the indication includes generating an indication that the CDR circuitry is locked when the value of the first counter exceeds a lock threshold (e.g., consistent with the operations at 706 and 707). Method 800 can also include incrementing a value of a second counter (e.g., counter2, as described in connection with method 700) when the average is above a second threshold (e.g., consistent with the operations at 708 and 709), wherein generating the indication comprises generating an indication that the CDR circuitry is unlocked when the value of the second counter exceeds an unlock threshold (e.g., consistent with the operations at 711 and 712).

Method 800 can also include acquiring (e.g., in parallel) the present first portions of the input at a first same point in time from at least a first register of the DCO and a second register of the DCO (e.g., first and second registers within frequency register 310), and acquiring the corresponding previous first portions of the input at a second same point in time from at least the first register and the second register.

Thus it is seen that a transceiver including CDR circuitry having a DCO and a CDR lock detector configured to generate a lock indication based on average frequency differentials output by the DCO has been provided.

As used herein and in the claims which follow, the construction "one of A and B" shall mean "A or B."

The foregoing is only illustrative of the principles of the invention, and that the invention can be practiced by other than the described implementations, which are presented for purposes of illustration and not of limitation, and the present invention is limited only by the claims which follow.

What is claimed is:

1. A transceiver for a network device, the transceiver including clock data recovery (CDR) circuitry having a digitally controlled oscillator (DCO) and a CDR lock detector, the CDR lock detector comprising:
a frequency differential calculator coupled to a first portion of an input to the DCO and configured to:
determine frequency differentials between a plurality of respective pairs of present first portions of the input to the DCO and corresponding previous first portions of the input to the DCO, and
determine an average of the frequency differentials for the plurality of respective pairs; and
circuitry configured to generate, based on the average, an indication of whether the CDR circuitry is locked.

2. The transceiver of claim 1, wherein:
the frequency differentials are based on a serial signal received by the transceiver;
when the CDR circuitry is locked, the transceiver recovers data of the serial signal; and
when the CDR circuitry is unlocked, the transceiver adjusts a timing associated with the DCO.

3. The transceiver of claim 1, wherein:
an output of the DCO is adjusted based on the input to the DCO;
the input to the DCO comprises a difference between a second portion and the first portion; and
the first portion and the second portion are filtered outputs of time error detector circuitry.

4. The transceiver of claim 1, wherein:
the frequency differential calculator is further configured to decimate the first portion of the input to the DCO; and
the frequency differentials are based on the decimated input.

5. The transceiver of claim 1, wherein each difference of the frequency differentials is an absolute value.

6. The transceiver of claim 1, wherein:
each difference of the frequency differentials is a difference between successive decimated first portions of the input to the DCO; and
each first input of the successive decimated inputs comprises a previous first portion and each second input of the successive decimated inputs comprises a present first portion.

7. The transceiver of claim 1, wherein the circuitry configured to generate the indication:
comprises a first counter; and
indicates that the CDR circuitry is locked based on a value of the first counter.

8. The transceiver of claim 7, wherein:
the first counter is configured to increment when the average is below a first threshold; and
the circuitry configured to generate an indication indicates that the CDR circuitry is locked when the value of the first counter exceeds a lock threshold.

9. The transceiver of claim 8, wherein the circuitry configured to generate an indication of whether the CDR circuitry is locked:

further comprises a second counter configured to increment when the average is above a second threshold; and indicates that the CDR circuitry is unlocked when a value of the second counter exceeds an unlock threshold.

10. The transceiver of claim 7, wherein the circuitry configured to generate an indication is further configured to reset the first counter to zero in response to providing the indication of whether the CDR circuitry is locked.

11. The transceiver of claim 1, wherein:

the present first portions of the input are acquired at a first same point in time from at least a first register of the DCO and a second register of the DCO, and the corresponding previous first portions of the input are acquired at a second same point in time from at least the first register and the second register.

12. A method for generating an indication of whether clock data recovery (CDR) circuitry of a transceiver is locked, the method comprising:

determining, using a frequency differential calculator, frequency differentials between a plurality of respective pairs of present first portions of an input to a digitally controlled oscillator (DCO) and corresponding previous first portions of the input to the DCO;

determining, using the frequency differential calculator, an average of the frequency differentials for the plurality of respective pairs; and generating the indication of whether the CDR circuitry is locked based on the average.

13. The method of claim 12, wherein, when the frequency differentials are based on a serial signal received by the transceiver:

generating an indication that the CDR circuitry is locked comprises determining that the transceiver is recovering data of the serial signal; and generating an indication that the CDR circuitry is unlocked comprises adjusting timing associated with the DCO.

14. The method of claim 12, further comprising:

generating an input to the DCO, wherein generating the input comprises subtracting a first portion from a second portion, wherein the first portion and the second portion are filtered outputs of time error detector circuitry; and adjusting an output associated with the DCO based on the input to the DCO.

15. The method of claim 12, further comprising:

decimating, using the frequency differential calculator, the first portion of the input to the DCO, wherein the frequency differentials are based on the decimated first portion of the input.

16. The method of claim 12, wherein:

determining the frequency differentials comprises determining respective differentials between successive decimated first portions of the input to the DCO; and the method further comprises registering each first output of the successive decimated outputs as a previous first portion and registering each second output of the successive decimated outputs as a present first portion.

17. The method of claim 12, wherein generating the indication comprises:

incrementing the value of a first counter when the average is below a first threshold; and generating the indication that the CDR circuitry is locked when the value of the first counter exceeds a lock threshold.

18. The method of claim 17, further comprising incrementing a value of a second counter when the average is above a second threshold, wherein generating the indication comprises generating an indication that the CDR circuitry is unlocked when the value of the second counter exceeds an unlock threshold.

19. The method of claim 17, further comprising:

acquiring the present first portions of the input at a first same point in time from at least a first register of the DCO and a second register of the DCO; and acquiring the corresponding previous first portions of the input at a second same point in time from at least the first register and the second register.

20. Apparatus comprising:

a host device configured to receive deserialized data from a transceiver; wherein:

the transceiver generates the deserialized data using clock data recovery (CDR) circuitry, the transceiver comprising:

a frequency differential calculator coupled to a first portion of an input to a digitally controlled oscillator (DCO) and configured to:

determine frequency differentials between a plurality of respective pairs of present first portions of the input to the DCO and corresponding previous first portions of the input to the DCO, and determine an average of the frequency differentials for the plurality of respective pairs; and circuitry configured to generate an indication of whether the CDR circuitry is locked based on the average.

* * * * *